Feb. 18, 1964  H. WEBER ETAL  3,121,569

GAS COMPRESSOR STUFFING BOXES WITH THROTTLE RINGS

Filed Sept. 6, 1960

INVENTORS:
HEINRICH WEBER
HEINRICH FRIEDENREICH
BY
ATT'YS

# United States Patent Office 3,121,569
Patented Feb. 18, 1964

3,121,569
GAS COMPRESSOR STUFFING BOXES WITH THROTTLE RINGS
Heinrich Weber and Heinrich Friedenreich, Ludwigshafen (Rhine), Germany, assignors to Badische Anilin- & Soda-Fabrik Aktiengesellschaft, Ludwigshafen (Rhine), Germany
Filed Sept. 6, 1960, Ser. No. 53,981
Claims priority, application Germany Sept. 5, 1959
5 Claims. (Cl. 277—24)

This invention relates in general to a new and improved method of sealing plungers at pressure of more than 100 atmospheres. More particularly, it relates to a new and improved grooved ring packing for plungers in gas compressors in which gas leakage is to be kept at a minimum.

It is known to seal plungers by means of grooved rings. The shape of, and the material for, the grooved rings are selected so that the rings are in contact with both the gas compressor housing and the plunger without any clearance.

As a rule, several grooved rings are arranged in a row. Between two adjacent grooved rings, a constant pressure is maintained. A lubricant can be introduced under adjustable constant pressure between the grooved rings to provide circualting lubrication.

The lubricant pressure between the compression chamber and the grooved ring which is nearest to the compression chamber is preferably kept equal to the suction pressure in the compression chamber. This should be done in order to avoid that the pressure in the stuffing box at the point of transition to the compression chamber becomes higher than the pressure in the compression chamber itself, which might lead to the penetration of sealing liquid from the stuffing box into the compression chamber when higher pressures prevail between the grooved rings.

It is a disadvantage that in the case of a substantial difference between the delivery pressure and the suction pressure in the compression chamber the grooved ring which is nearest to the compression chamber is subjected to high permanent alternating stresses which may lead to the rapid destruction of said ring.

It is not possible to prolong the life of the individual grooved rings by the known method of fitting a plurality of rings in a row, if it is desired to achieve a perfect seal with small gas leakage. On the contrary, one ring after another is subjected to the high bending stresses until all the rings have broken. It is known to use stuffing boxes provided with a plurality of throttle rings. Since the throttle rings have an annular clearance to allow the passage of gases, stuffing boxes of this type show a constant loss of leakage gas, which is intentional. In the throttle rings arranged in a row, the pressure of the leakage gas is reduced to the counter pressure in the stuffing box, usually down to the level of the external pressure of 1 atmosphere absolute. Since, however, at increased pressures, for example at above 100 atmospheres gage, the amounts of leakage gas and consequently the cost increase very rapidly, stuffing boxes with throttle rings can be used only to a limited extent.

It is an object of the present invention to provide a stuffing box for sealing plungers which shows only small amounts of leakage gas even at increased pressures of between 100 and 3000 atmospheres gage.

Another object of the invention is to prolong the life of grooved packing rings especially of the grooved packing ring which is nearest to the compression chamber.

A further object of the invention is to provide lubrication for the grooved packing rings in such a manner that they are not prematurely destroyed.

Yet another object of the invention is to provide lubrication for the stuffing box in such a manner that the lubricant cannot enter the compression chamber.

A further object of the invention is to maintain, in the space between the scraper ring and the adjacent throttle ring, a pressure which lies between the suction pressure $P_S$ and the delivery pressur $P_E$ in the compression chamber.

These and other details of the invention will become evident in the following detailed description which should be read with reference to the accompanying drawing, but it will be understood that the embodiment of the invention illustrated is given by way of example only and not by way of limitation.

Figure 1:
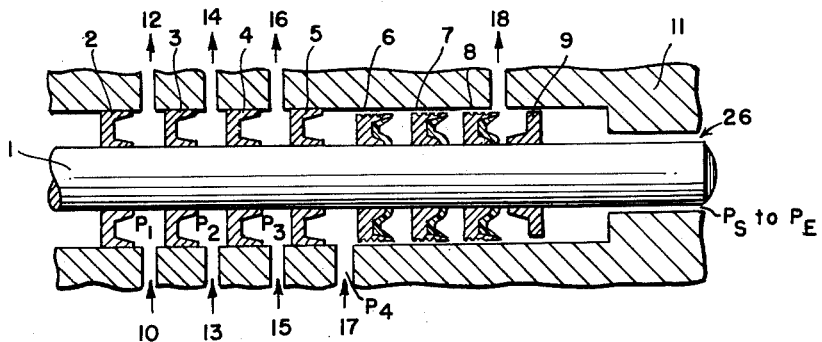
FIGURE 1 represents a section through the stuffing box according to the present invention.

FIGURE 1 shows a stuffing box in which, for the sealing of plunger 1, four grooved packing rings 2, 3, 4 and 5 are installed in a row rigidly and at intervals in the stuffing box chamber. These grooved rings are made of rubber-elastic material, such as natural rubber, elastomer or other plastic with similar properties. The particular kind of material to be used for the grooved rings is chosen with regard to the gas to be compressed, i.e., with regard to the corrosive and destructive effect that such gas will have on the grooved rings. Furthermore, prevailing operating temperatures are to be taken into account when selecting such material.

Three throttle rings 6, 7 and 8 are provided between the set of grooved packing rings and the compression chamber 26. Whereas the grooved packing rings 2, 3, 4 and 5 are so designed that they provide a gastight seal, the throttle rings 6, 7 and 8 allow the passage of small amounts of gas by way of a clearance.

Figure 2:
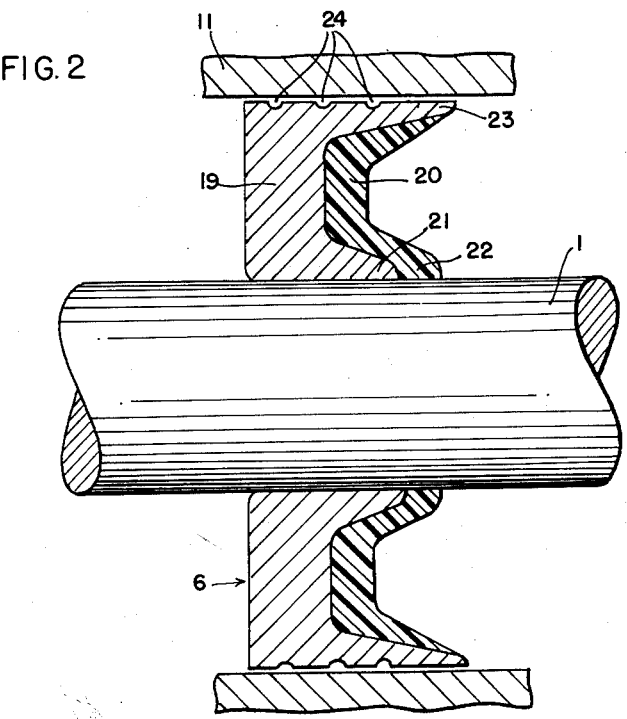
FIGURE 2 represents a section through a throttle ring.

FIGURE 2 shows a throttle ring in the form of a two-part lip ring made of metal, preferably bronze, and plastic. A metallic lip ring 19 is united with a plastic lip ring 20. The inner lips 21 and 22 of the lip rings 19 and 20 fit on the plunger 1, whereas a throttle clearance is provided between the outer metal lip 23 and the inner wall of the stuffing box which permits the passage of small amounts of oil or gas. The throttle clearance may be enlarged by annular grooves 24. During the reciprocating movement of the plunger 1, lubricant is scraped off the same by the throttle rings and accumulated in the spaces between the grooved packing rings and between the throttle rings so that these spaces become partly filled.

Axially between the throttle rings 6, 7 and 8 and the compression chamber, there is provided a scraper ring 9 of metal or rubber-elastic material, such as natural rubber or elastomer. As may be seen from FIGURE 1, the lip provided at the inner side of the scraper ring fits on the plunger 1. During forward movement of the plunger 1, the scraper ring scrapes the lubricant off the same, and the lubricant is discharged through a bore 18 provided in the housing 11. The clearance provided between the scraper ring 9 and the housing 11 is so dimensioned that it permits equalization of pressure between the spaces on both sides of the scraper ring 9.

The grooved packing rings 2, 3, 4 and 5, the throttle rings 6, 7 and 8 as well as the scraper ring 9 are fixed in the stuffing box chamber, for example by means of spacer rings. They are secured from outside, for example by means of a stuffing box giand.

Lubricant is supplied to the spaces between the grooved packing rings 2, 3, 4 and 5 and to the space between the grooved packing ring 5 and the throttle ring 6. The lubricant is retained by the throttle rings and may in part pass through the clearance at the outer ends of the throttle rings. It is thus ensured that the grooved packing rings are completely immersed in lubricant and their life is thus prolonged.

Part of the lubricant enters through a bore 10 in the housing 11 into the space between the grooved packing rings 2 and 3 and passes out through a bore 12. It is under a pressure $P_1$. Another portion of the lubricant enters through a bore 13 and passes out through a bore 14. It is under a pressure $P_2$. Further lubricant enters through a bore 15 under a pressure $P_3$ and passes out through a bore 16. The pressure $P_1$ is lower than $P_2$, which is lower than $P_3$, and $P_3$ is equal to the suction pressure $P_S$. Lubricant under a pressure $P_4$ enters through a bore 17 into the free space of the stuffing box, $P_4$ having a value lying between $P_S$ and $P_E$. $P_E$ represents the delivery pressure of the compression stage produced by the plunger. As described above, the lubricant introduced through the bore 17 passes through the clearances of the throttle rings 6, 7 and 8, is retained by the scraper ring 9 and finally passes out of the stuffing box through the bore 18.

By employing throttle rings according to the present invention the grooved packing ring which is nearest to the compression chamber is not subjected to the full extent of the pressure fluctuations between the suction pressure $P_S$ and the compression pressure $P_E$ in the compression chamber, but the pressure fluctuations are reduced by the clearances of the throttle rings.

A special advantage of the invention lies in the prolongation of the life of grooved ring stuffing boxes. Even in the case of a substantial difference between the delivery pressure and the suction pressure of a compression stage and in the case of a high absolute delivery pressure, it is possible to use grooved rings and thus to achieve effective sealing with the smallest possible loss of leakage gas. It is another advantage of the invention that the penetration of lubricant into the compression chamber is prevented. Such penetration is undesirable because mixing of the lubricant with the gases being compressed may interfere with a subsequent reaction. The entry of lubricant into the compression chamber is prevented with certainty by the scraper ring provided between the compression chamber and the throttle ring which is nearest to the compression chamber.

By a stuffing box according to this invention, the life of the grooved packing rings is considerably prolonged and the amount of leakage gas is diminished.

We claim:

1. The combination of a stuffing box packing sealing a reciprocating rod in a gas compressor which comprises a stuffing box with a cylindrical chamber, a gas compression chamber communicating with an axial end of said cylindrical chamber of said stuffing box, a rod extending through said cylindrical chamber of said stuffing box and into said compression chamber and reciprocable axially in said cylindrical chamber and said compression chamber, a plurality of elastic, circumferentially grooved, fixedly spaced, sealing rings positioned in said stuffing box about said rod and sealing the space between said rod and the cylindrical wall of said cylindrical chamber of said stuffing box and dividing the space between said rod into side-by-side lubricant chambers, a plurality of fixedly spaced throttle rings positioned in said stuffing box about said rod at an axial position between said axial end of said stuffing box and the closest of said sealing rings to said axial end and positioned radially in the space between said rod and the inner wall of said cylindrical chamber, said throttle rings each including a metal, cylindrical, radially outer wall having a clearance between it and the inner wall of said stuffing box, said throttle ring having an axial hole in which said rod is slidably journalled with a substantially gas-tight fit therebetween, and a fixed scraper ring in said stuffing box about said rod and positioned axially between said throttle ring closest to said compression chamber and said compression chamber and extending radially between said rod and the cylindrical wall of said stuffing box, said scraper ring being in sealing, sliding contact with said rod.

2. The combination as claimed in claim 1 wherein lubricant inlet connections for each of said lubricant chambers are provided in the wall of the stuffing box housing, for the supply of lubricant to said chambers and also for supply of lubricant to the space between the sealing ring which is nearest to the compression chamber and the adjacent throttle ring, whereby each of said chambers may be filled with lubricant and maintained at progressively diminishing lubricant pressures in a direction from the compartment closest to said axial end toward the compartment farthest from said end and also said space between said sealing ring and said adjacent throttle ring at a lubricant pressure which is between the suction pressure and the compression, delivery pressure of said compression chamber.

3. The combination according to claim 2 wherein a clearance is provided between the scraper ring and the cylindrical wall of said cylindrical chamber of the stuffing box, and an outlet connection is provided, in the cylindrical wall of the stuffing box housing between the scraper ring and the adjacent throttle ring, for the discharge of the lubricant which has escaped from said space between said sealing ring and throttle ring and has also escaped past said throttle rings into the space between said scraper ring and its adjacent throttle ring.

4. The combination as claimed in claim 1 wherein said throttle rings each comprise a metal body having a cylindrical outer wall and an axial aperture therethrough, and an elastic ring body united to said metal body on a face of said metal body with an axial aperture in said elastic body which is of the same size as and is coaxial with said aperture in said metal body, the radially outer edge of said elastic ring body terminating radially inwardly of said cylindrical, outer wall, said coaxial apertures together defining said axial hole in which said rod is slidably journalled.

5. The combination as claimed in claim 1 wherein said throttle rings each comprise a solid metal base having an axially extending annular, metal lip at the outer circumference thereof, the outer circumference of said base and said lip defining a cylindrical wall, a second, annular, metal lip extending from said base in the same axial direction as said first-mentioned lip, said second annular lip being concentric with and radially inwardly spaced with respect to said first-mentioned lip, said base and said second lip having a central, axial hole extending therethrough, a ring of an elastomer united with the opposing faces of said lips and with the face of the base between said lips, said ring having a lip portion extending over the axially outer edge of said second lip and forming the hole of said ring, which hole is of the same diameter as and is concentric with said hole in said base, said hole of said ring and said hole of said base together defining said axial hole in which said rod is slidably journalled.

References Cited in the file of this patent

UNITED STATES PATENTS

| 1,747,253 | Leroy | Feb. 18, 1930 |
| 2,709,629 | Ledinegg | May 31, 1955 |
| 3,011,808 | Tucker et al. | Dec. 5, 1961 |

FOREIGN PATENTS

| 959,161 | France | Sept. 21, 1949 |